United States Patent [19]

Hütter

[11] Patent Number: 4,594,623
[45] Date of Patent: Jun. 10, 1986

[54] ROTARY SCANNING TAPE RECORDER WITH IMPROVED HEAD DRUM CLAMPING

[75] Inventor: Heinrich Hütter, Tulln, Austria

[73] Assignee: U.S. Philips Corporation, New York, N.Y.

[21] Appl. No.: 675,055

[22] Filed: Nov. 26, 1984

[30] Foreign Application Priority Data

Mar. 6, 1984 [AT] Austria .................. 752/84

[51] Int. Cl.[4] .......................................... G11B 5/027
[52] U.S. Cl. .......................... 360/84; 360/85; 360/130.22; 403/373; 403/374
[58] Field of Search .................. 360/84–85, 360/95, 104, 107, 129; 403/373–374, 334; 369/270

[56] References Cited

U.S. PATENT DOCUMENTS 1,340,396 5/1920 Martin ................................ 403/374
4,464,690 8/1984 Hanecka et al. .................... 360/84

FOREIGN PATENT DOCUMENTS 2118684 11/1983 United Kingdom ............... 403/373

Primary Examiner—John H. Wolff
Assistant Examiner—Matthew J. Bussan
Attorney, Agent, or Firm—David R. Treacy

[57] ABSTRACT

In a rotary scanning magnetic tape recorder having a head support clamped on a shaft by a cylindrical portion, a clamping ring which is adjustable axially has at least three clamping projections arranged axially symmetrically with respect to the shaft and projecting radially toward and contacting the cyclindrical portion. An adjusting ring, rotatable with respect to the support, bears against the clamping ring through at least three cam-and-follower arrangements arranged axially symmetrically relative to the shaft. The adjusting ring is rotated with respect to the support by engagement of a pinion through a bore in the clamping ring and meshing with an annular gear segment on the adjusting ring.

29 Claims, 8 Drawing Figures

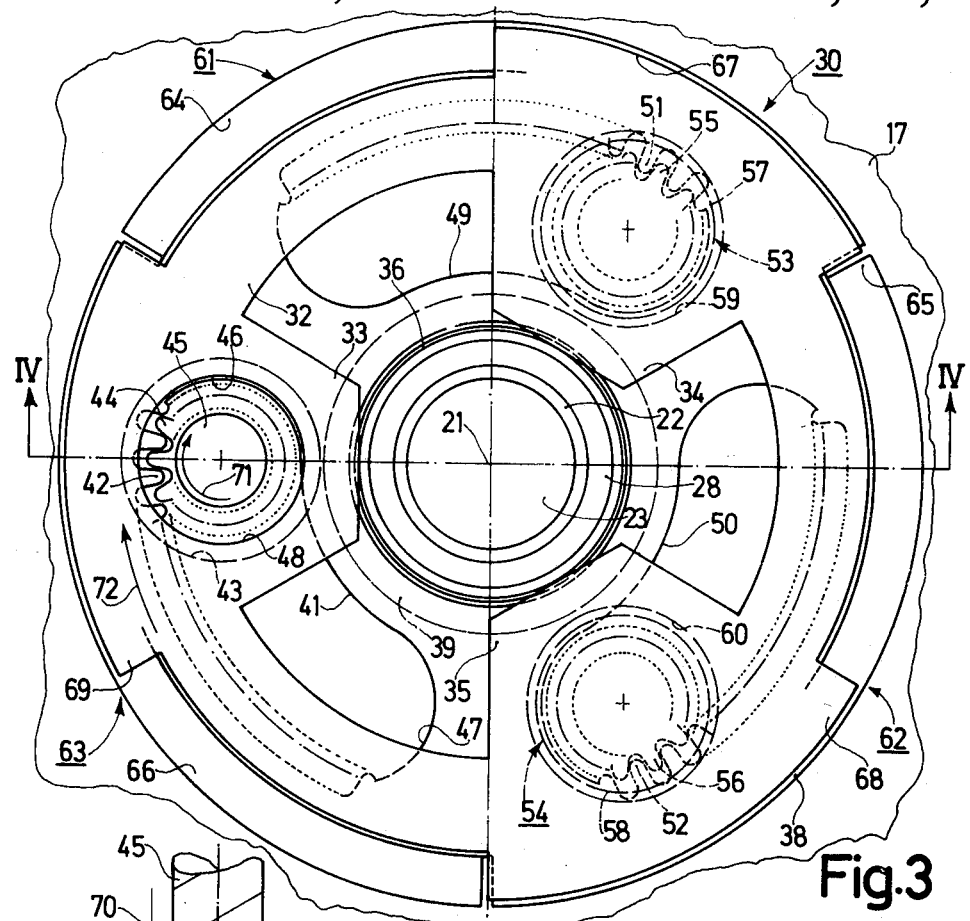
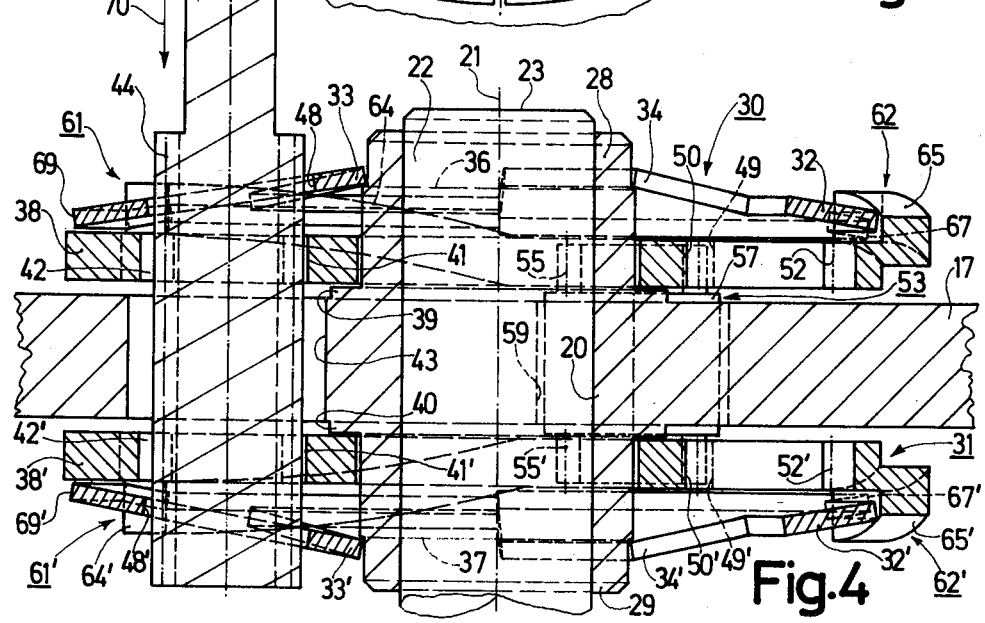

ROTARY SCANNING TAPE RECORDER WITH IMPROVED HEAD DRUM CLAMPING

BACKGROUND OF THE INVENTION

The invention relates to a recording and/or reproducing apparatus for a magnetic tape, which apparatus comprises at least one rotatable magnetic head which scans the magnetic tape along information tracks and which is mounted on a support which comprises a hub, by means of which the support is mounted on a rotatable shaft. Such apparatus, whether for recording or playback, will hereafter be called a rotary scanning tape recorder.

The support for such a tape recording includes at least one hollow cylindrical portion, which is coaxial with the shaft, which projects axially from the hub and which cooperates with a releasable clamping device for clamping the portion onto the shaft. The clamping device comprises an axially adjustable clamping ring which is coaxial with the shaft. The clamping ring has three clamping projections which project radially towards the shaft to act on the cylindrical portion, which are inclined equally relative to said shaft, which are arranged axially symmetrically relative to the shaft; that is, the projections are arranged about the shaft axis as an axis of symmetry such that the angular distances of the projections from each other are equal. For adjusting the clamping ring, the device also includes a rotatable adjusting ring which cooperates with the clamping ring and which is coaxial with the shaft, the clamping projections clamping the cylindrical portion onto the shaft by means of the clamping ring upon rotation of the adjusting ring.

Such a tape recorder is disclosed in Austrian Pat. No. 365,808, to which U.S. Pat. No. 4,464,690 corresponds. For adjusting, this recorder has an adjusting ring which engages the support through a screwthread, the movement of the adjusting ring being transmitted to the clamping ring via a thrust ring. In order to clamp the cylindrical portion of the hub of the support onto the shaft the support must be retained and the adjusting ring must be tightened. As a result of the large frictional forces acting between the threaded surfaces, between the adjusting ring and the thrust ring, and between the thrust ring and the clamping ring, during clamping the support must be retained with comparatively large forces when it is mounted. However, these forces give rise to internal stresses in and deformations of the support, which persist at least for the greater part after clamping has been completed and give rise to both a radial and an axial eccentricity during rotation of the support. An eccentric non-uniform rotation of the support adversely affects the scanning of the information tracks by the magnetic head during the recording and/or reproduction of information. Moreover, the clamping ring of the clamping device of the known apparatus may also rotate when the adjusting ring is tightened during clamping, so that the clamping projections of the clamping ring rub over the cylindrical portion of the support. This gives rise to a groove-like irregular deformation of the cylindrical portion which is undesirable because the three clamping projections should exert large and equal clamping forces which are reproducible after the clamping device has been released and retightened.

SUMMARY OF THE INVENTION

The object of the invention is to mitigate the above-mentioned problems in a rotary scanning tape recorder, and to provide an apparatus in which an undesired rotation of the clamping ring when the support is clamped onto the shaft is precluded, in which no internal stresses in and deformations of the support are possible, and in which the support can be clamped onto the shaft with very small actuating forces for the clamping device.

To this end the invention is characterized in that on its side which is remote from the clamping ring the adjusting ring bears on the support axially symmetrically relative to the shaft; that is, the manner in which the adjusting ring bears on the support is such that, on rotation of the shaft through $2\pi/N_b$ radians, where $N_b$ is the number of locations of principal bearing force against the support, the resulting force distribution is indistinguishable from the original distribution. To accomplish this result, the adjusting ring is adjusted by an axially symmetrical (equi-angularly spaced) arrangement of gear segments and bores; and corresponding axially symmetrical cam-and-follower arrangements adjust the clamping ring at locations respectively related to the clamping ring projections as a result of rotation of the adjusting ring.

Preferably, the adjusting ring includes at least one gear segment which is coaxial with the shaft and which can be driven by a rotatable pinion to rotate the adjusting ring. The clamping ring has a bore which is parallel to the shaft, and is aligned with the gear segment on the adjusting ring so that a pinion which is in mesh with the gear segment can extend through the bore and be at least partly positioned against the bore wall. At least three cam-and-follower means, for adjusting the clamping ring upon rotation of the adjustment ring, are arranged axially symmetrically relative to the shaft. Each cam-and-follower means comprises a cam surface on one of the two rings, which surface is upwardly inclined towards the other one of the two rings and extends substantially tangentially of the shaft, and a cam follower which cooperates with the cam surface and is arranged on the other one of the two rings. Since the adjusting ring is now rotated by means of a gear drive and the clamping ring is adjusted by cam-and-follower means, a favorable low force transmission is achieved by a suitable choice of the transmission ratio of the gear drive and the cam-and-follower means, and because of the low friction properties these simple mechanisms, so that large clamping forces can be obtained by driving the pinion with a small driving force. Since the driving forces are small the forces required for retaining the support when it is clamped onto the shaft are now so small that they do not cause any substantial internal stresses in and substantial deformations of this support, thereby guaranteeing a uniform rotation of this support after the support has been clamped onto the shaft. This also results in a uniform and correct scanning of the information tracks by the magnetic head arranged on the support during recording and/or reproducing. Since upon rotation of the adjusting ring the clamping ring is positioned against the pinion, which extends through the bore in this clamping ring, which drives the gear segment on the adjusting ring, and which remains at the same location while being rotated, rotation of the clamping ring is precluded in a simple manner.

The bore in the clamping ring may be, for example, of rectangular or square cross-section and may surround the pinion with clearance. It is found to be advantageous if the bore in the clamping ring is cylindrical and the bore wall is positioned against the pinion. The cylindrical bore in the clamping ring thus also guides the pinion as it is rotated.

The gear segment on the adjusting ring may be arranged on, for example, the outer circumference of the adjusting ring. However, it is found to be advantageous if the adjusting ring has an annular slot which is coaxial with the shaft, the gear segment, which can be driven by the pinion, being situated on one of the two bounding walls of the slot which are coaxial with the shaft. In this way the radial dimensions of the clamping device are minimized.

The range of rotation of the adjusting ring may be defined by separate stops, for example on the support. It is found to be advantageous that if the clamping device is released the bounding wall at one of the two ends of the slot abuts with the pinion which is in mesh with the gear segment and when the clamping device has been tightened the bounding wall at the other end abuts with the pinion. Thus, without special means the range of rotation for the adjusting ring is defined simply by the slot which cooperates with the pinion.

The cam surface of each cam-and-follower means may be provided, for example, on the clamping ring and may comprise a separate wedge which is secured to the clamping ring, the cam follower being a roller which is mounted for rotation on the adjusting ring and which cooperates with the wedge. It is found to be advantageous if the cam surface of each cam-and-follower means is situated on the adjusting ring and comprises an annular portion of the adjusting ring, which portion tapers towards the clamping ring, and the cam follower of each cam-and-follower means is arranged on the clamping ring and comprises an annular portion of the clamping ring, which annular portion projects from the circumference of said ring and extends at least partly over the cam-surface portion of the adjusting ring. This results in a particularly simple and compact cam-and-follower means, while at the same time a compact, stable and easy-to-manufacture construction is obtained both for the adjusting ring and for the clamping ring.

A journal of the pinion may extend, for example, through the bore in the clamping ring so as to be rotatably journalled in the clamping ring, the pinion always being in mesh with the gear segment on the adjusting ring. It is found to be advantageous if the pinion is constructed so as to be disengageable and removable from the gear segment on the adjusting ring of the clamping device. This enables the removable pinion to be employed for driving the gear segments of the adjusting rings of a plurality of clamping devices so that it is not necessary to provide a separate pinion for each of these clamping devices, which constitutes a saving.

In this respect it is found to be advantageous if the pinion has an actuating member for the rotary drive of this pinion. This simplifies the clamping operation. The member on the pinion may be constructed so as to obtain a manually or a machine driven pinion.

In an apparatus in which the support comprises two hollow cylindrical portions which project from its hub in axially opposite directions, which are coaxial with the shaft, and which each cooperate with a clamping device, as described in the afore-mentioned U.S. Pat. No. 4,464,690, a separate pinion may be provided for driving the gear segment on the adjusting ring of each of the two clamping devices. It is found to be advantageous if the gear segments on the adjusting rings of the two clamping devices have equal pitch radii and identical teeth and for driving two gear segments to rotate the two adjusting rings simultaneously, there is provided one pinion which extends through a bore in the support at least when the two gear segments are driven. In this way the support can be clamped on the shaft by means of two clamping devices in a simple, time-saving, reliable and uniform manner.

In this respect it is also found to be advantageous in an embodiment in which the pinion for driving the gear segments is removable from the adjusting rings of the two clamping devices, if the adjusting rings of the two clamping devices each comprise at least one further gear segment which is coaxial with the shaft, and these further gear segments on the two adjusting rings have equal pitch radii and identical teeth, are axially in register and are coupled to each other by means of a gear bridge, the two gear segments for rotating the two adjusting rings also being axially in register with each other. This ensures that when the pinions have been removed from the clamping devices the two gear segments for rotating the two adjusting rings remain in register, so that the pinion can readily be brought into mesh with the two registered gear segments by axially moving this pinion.

The gear bridge may comprise, for example, two separate coaxial gear wheels which each mesh with one of the two further gear segments on the two adjusting rings, which are coupled to each other by a cylindrical connecting member, and which are rotatably journalled on at least one of the two adjusting rings. Alternatively, the gear bridge may comprise a single gear wheel which is rotatably journalled on at least one of the adjusting rings and which meshes with the two further gear segments. It is found to be advantageous if the gear bridge comprises two coaxial gear wheels which each mesh with one of the two further gear segments on the two adjusting rings, which are connected to each other via a cylindrical connecting member whose diameter is larger than the diameter of the root circle of the two gear wheels and which is retained by the two further gear segments on the two adjusting rings to float axially between the two adjusting rings. This yields a very simple construction which does not require separate means for the axial mounting of the gear bridge.

The further gear segments on the two adjusting rings may be arranged, for example, on the outer circumference of the adjusting rings. However, it is found to be advantageous if the adjusting rings of the two clamping devices each have at least one annular recess which is coaxial with the shaft and if these recesses in the two adjusting rings are axially in register with each other, one of the further gear segments being formed on one of the two bounding walls of each recess, which walls are coaxial with the shaft and are axially in register. This minimizes the radial dimensions of the clamping devices.

In order to minimize the radial dimensions of the clamping devices it is also found to be advantageous if the gear segment which serves for rotating an adjusting ring is situated on said ring and at least one further gear segment is situated on said ring axially symmetrically relative to the shaft. This ensures that all the gear segments on an adjusting ring have the same minimal radial distance from the shaft.

Two embodiments of the invention will be described in more detail, by way of example, only with reference to the drawings.

BRIEF DESCRIPTION OF THE DRAWING

FIG. 3 is a plan view taken on the line III—III in FIG. 2, and on an enlarged scale in comparison with FIG. 2 showing a part of the drum half with two released clamping devices.

FIG. 4 is a sectional view taken on the line IV—IV in FIG. 3, showing the part of the drum half with the two released clamping devices.

DESCRIPTION OF THE PREFERRED EMBODIMENTS

Figure 1:
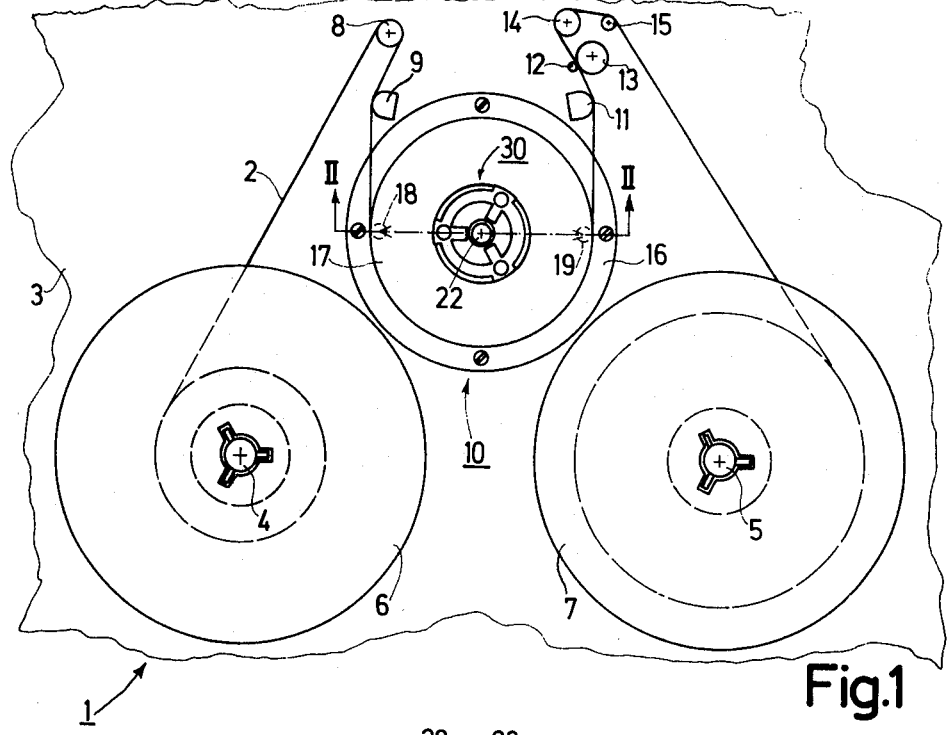
FIG. 1 is a schematic plan view of a part of a rotary scanning tape recorder, the magnetic tape being partly wrapped around a two-part guide drum.

FIG. 1 shows schematically a part of a rotary scanning tape recorder 1 for recording and/or reproducing video and audio information on or from a magnetic tape 2. The apparatus 1 comprises a deck plate 3, which carries a supply spindle 4 and a take-up spindle 5, which serve for driving a supply reel 6 and a take-up reel 7, respectively, mounted on the corresponding winding spindles 4 and 5. On its way from the supply reel 6 to the take-up reel 7 the magnetic tape 2 passes a tape guide 8 for guiding the magnetic tape; a magnetic erase head 9 for erasing all the information which may be stored on the magnetic tape; a guide drum 10, which will be described in more detail hereinafter; a magnetic recording and/or playback head 11 for recording and/or reproducing audio information from or on the magnetic tape; a capstan 12 which, in conjunction with a pressure roller 13 which in a manner, not shown, can be moved towards and applied to the capstan, provides a uniform transport of the magnetic tape during a recording and-/or reproducing process; and two further tape guides 14 and 15 for guiding the magnetic tape 2. It will be appreciated that the supply reel 6 and the take-up reel 7 may be accommodated in a cassette, in which case the magnetic tape can be extracted from the cassette and can threaded around the afore-mentioned parts by means of a suitable device.

Figure 2:
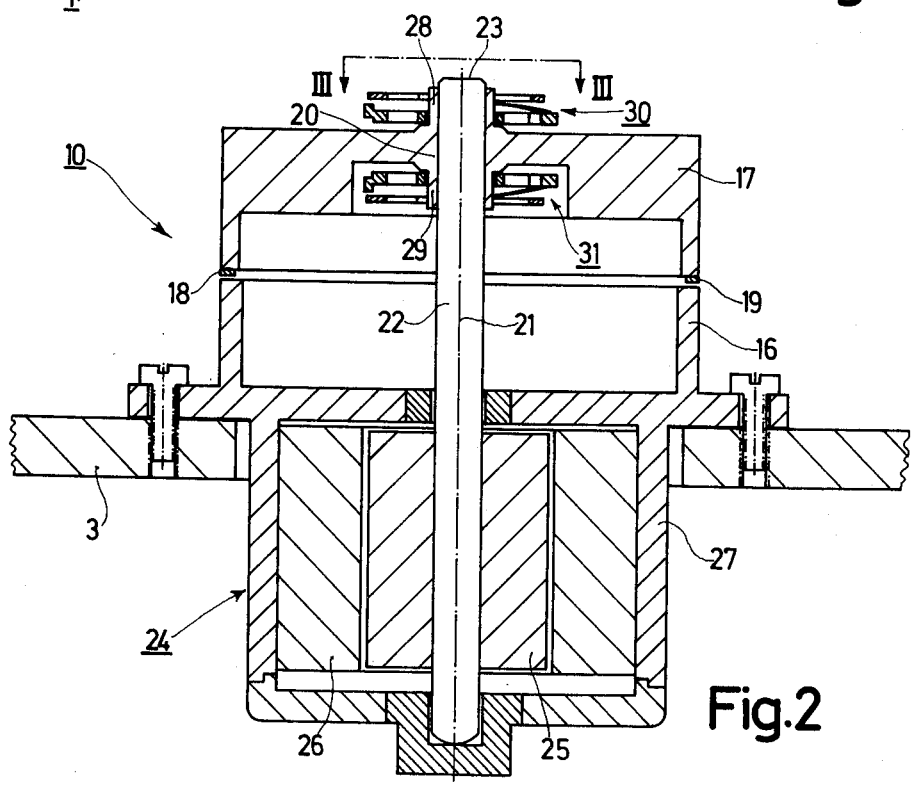
FIG. 2 is a sectional view taken on the line II—II in FIG. 1 and showing the guide drum of the recorder shown in FIG. 1, whose rotatable drum half which carries two magnetic heads is clamped onto the drive shaft by means of two clamping devices in a first embodiment of the invention.

As is customary in equipment of this type, the magnetic tape is wrapped around the circumferential surface of the tape-guide drum along a helical path. At least one rotatable magnetic head is arranged on the drum, for recording and/or reproducing video information, by scanning the magnetic tape along information tracks which are inclined relative to the longitudinal direction of said tape. As can be seen in FIG. 2, the tape guide drum 10 in the present embodiment comprises a stationary drum half 16 which is secured to the deck plate 3 and a rotatable drum half 17 which is coaxial with the stationary drum half.

The rotatable drum half 17, which in this embodiment serves as a support for carrying two magnetic heads 18 and 19 for recording and/or reproducing video information and may be made of an aluminum alloy, comprises a hub 20 by which the drum half 17 is mounted on a shaft 22 near its free end 23. The shaft can be rotated about an axis 21. The shaft 22 and hence the drum half 17 are driven directly by a motor 24, shown schematically, which cooperates directly wih the shaft 22 in that the rotor 25 of the motor is mounted coaxially on the shaft and is rigidly connected thereto. The stator 26 of the motor is mounted in a motor housing 27 which forms a unit with the stationary drum half 16. In this way the motor 24 and the entire tape-guide drum 10 constitute a unit which can be mounted simply on the deck plate 3.

The drum half 17 comprises two hollow cylindrical portions 28 and 29 which project from the hub 20 in opposite axial directions. For coupling the drum half 17 to the shaft 22, two releasable clamping devices 30 and 31 respectively clamp the two cylindrical portions 28 and 29 onto the shaft 22 in respective axially spaced clamping zones. For a correct operation of the apparatus, to ensure a correct recording and/or reproduction of the video information by means of the relevant magnetic heads, it is essential that the rotatable drum half 17 which carries the magnetic heads is clamped onto the shaft 22 in a precise and reliable manner by means of the clamping device 30 and 31, so that the drum half 17 revolves absolutely uniformly and without eccentricities.

The two clamping devices 30 and 31 will now be described in more detail with reference to FIGS. 3 to 6. As is apparent from these figures, the two clamping devices 30 and 31 are identical and are arranged mirror-symmetrically relative to that part of the drum half 17 which is disposed between the two clamping devices. For this reason corresponding parts of the two clamping devices 30 and 31 bear the same reference numerals, the reference numerals for the parts of the clamping device 31 being primed.

The two clamping devices 30 and 31 each comprise a disc-shaped clamping ring 32, 32' which is coaxial with the shaft 22 and which is adjustable in the axial direction of the shaft. These rings have clamping projections 33, 34, 35 and 33', 34', 35' respectively, which extend radially of the shaft, which are inclined equally relative to the shaft, which are arranged axially symmetrically relative to the shaft, and which act on the cylindrical portions 28 and 29, respectively. Owing to the axially symmetrical arrangement of the clamping projections the clamping forces exerted on the cylindrical portions by the clamping projections act exactly axially symmetrically relative to the axis 21 of the shaft 22, so that a perfectly symmetrical relationship between the forces is achieved, which is essential for a correct rotation of the drum half 17. The free ends of the clamping projections are positioned on steps 36 and 37 of the cylindrical portions 28 and 29, respectively. In a simple manner this arrangement ensures that the three clamping projections of each clamping ring 32, 32' act not only axially symmetrically on the relevant cylindrical projection but also at the same level, so that during clamping the clamping projections do not exert bending moments on the cylindrical portions and the shaft. This freedom from unbalanced moments is also essential for a correct rotation of the drum half 17. The clamping rings 32, 32' may be made of, for example, steel or phosphor bronze and have a thickness of the order of magnitude of half a millimetre. When the clamping devices are released, as is shown in FIGS. 3 and 4, the clamping rings 32, 32' including their clamping projections have conical shapes and when the clamping devices are tightened, as is shown in FIGS. 5 and 6, the clamping rings 32, 32' with their clamping projections have expanded, flat shapes.

In order to adjust the clamping ring 32, 32' of each clamping device 30, 31 in the axial direction of the shaft, each of the two clamping devices comprises a rotatable disc-shaped adjusting ring 38, 38' which is coaxial with the shaft 22 and which cooperates with the clamping ring 32, 32' by means of cam-and-follower means, to be described hereinafter. These means are arranged axially symmetrically relative to the shaft 22. The adjusting rings may be made of, for example, hardened steel and have a thickness of the order of magnitude of one millimetre. On the side which is remote from the clamping ring 32, 32' the adjusting ring 38, 38' of each clamping device 30 and 31, respectively is support axially symmetrically relative to the shaft 22 by a step portion 39 or 40 of the drum half 17 which adjoins the cylindrical projection 28 or 29. This is also important for an axially symmetrical force balance.

Figure 5:
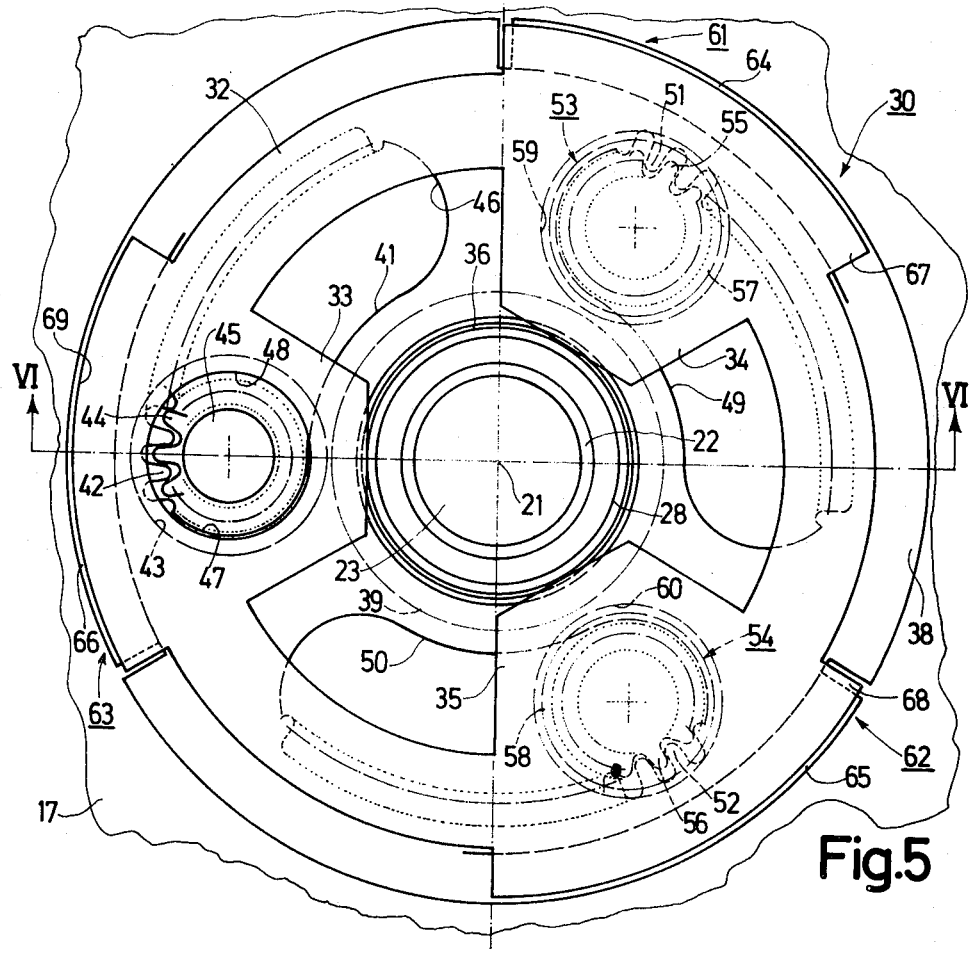
FIG. 5 in the same way as FIG. 3, shows the part of the drum half with the two tightened clamping devices in the first embodiment of the invention.
Figure 6:
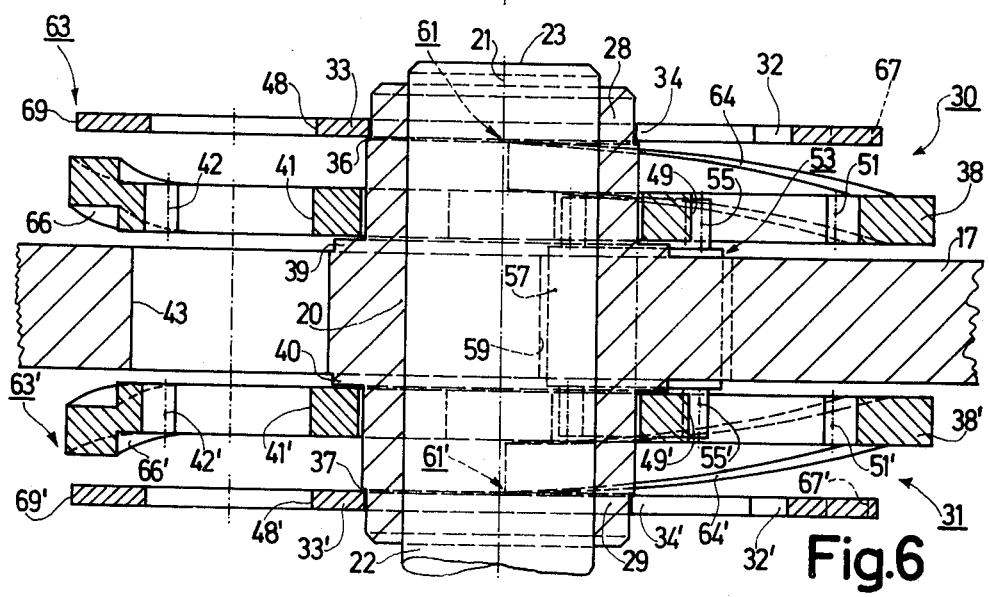
FIG. 6, in the same way as FIG. 4, is a sectional view showing the part of the drum half with the two tightened clamping devices.

When the adjusting ring 38 is rotated clockwise from its position shown in FIG. 3 to its position shown in FIG. 5 the clamping ring 32 of the clamping device 30 is moved towards the free end 23 of the shaft and when the adjusting ring 38' is rotated similarly the clamping ring 32' of the clamping device 31 is moved in a direction away from the free end 23 of the shaft 22, so that the clamping rings 32, 32' together with their clamping projections 33, 34, 35, 33', 34', 35', are expanded from a conical shape to a flat shape and the clamping projections thereby clamp the cylindrical portions 28, 29 onto the shaft 22, as is shown in FIGS. 5 and 6. The change in shape of the clamping rings 32, 32' from conical to the flat during clamping, which causes the free ends of the clamping projections to be displaced in a radial direction relative to the cylindrical portions 28, 29, provides a satisfactory, axially symmetric force transmission. Each of the two adjusting rings 38, 38' comprises an annular slot 41, 41' which is coaxial with the shaft 22, a gear segment 42, 42' which is coaxial with the shaft being formed on that bounding wall of the slot 41, 41' which is remote from the shaft 22 and which is coaxial with the shaft, which gear segments are shown partly in dotted lines in FIGS. 3 and 5. The gear segments 42, 42' on the two adjusting rings 38, 38' of the two clamping devices 30 and 31 have equal pitch radii and identical teeth.

For simultaneously rotating the two adjusting rings, the two gear segments 42, 42' on the adjusting rings 38, 38' can be driven by a single rotatable pinion 44 which meshes with the gear segments 42, 42' and extend through a cylindrical bore 43 in the drum half 17. This enables the two clamping devices to be tightened and released in a simple manner at the same time, the clamping device 31 which is arranged inside the tape guide drum 10 being actuated simply from outside the tape-guide drum 10. The gear drive for the adjusting rings provides a satisfactory and substantially loss-free force transmission. The pinion 44 is disengageable from the gear segments 42, 42' on the adjusting rings 38, 38' and can be removed from the clamping devices 30 and 31. In order to disengage the pinion 44 from the two gear segments 42, 42' or to bring the pinion into mesh with the gear segments, the pinion 44 is simply passed through the slots 41, 41' in the adjusting rings 38, 38' in an axial direction relative to the shaft 22 and through the bore 44 in the drum half 17. For a simple actuation and drive of the pinion 44 the pinion is provided with a shaft-like portion 45 for its rotary drive. The detachable pinion 44 may be employed for driving a plurality of clamping devices and is suitably made of a wear-resistant material.

In order to limit the range of rotation of the adjusting rings 38, 38' which in the present case is approximately 60 degrees, the bounding walls of the slots 41, 41' cooperate near the ends of these slots with the pinion 44 which is in mesh with the gear segments 42, 42' so that separate stops may be dispensed with. At their ends designated 46, 46', the bounding walls of the slots 41, 41' in the two adjusting rings are positioned against the pinion 44 when the clamping devices 30 and 31 are released, as is shown in FIG. 3. When the clamping devices 30 and 31 have been tightened, the ends marked 47, 47' of the bounding walls of the slots 41, 41' are positioned against the pinion 44, as can be seen in FIG. 5.

The clamping ring 32, 32' of each clamping device 30 and 31 comprises a cylindrical bore 48,48' which in the axial direction of the shaft 22 is disposed opposite the gear segment 42, 42' on the adjusting ring 38, 38' of the relevant clamping device. The pinion 44, which meshes with the gear segments 42, 42' on the two adjusting rings 38, 38', extends through the bore 48, 48' and is positioned against the wall of said bore. Thus, the pinion 44, which is rotated when driven but which is otherwise retained via the portion 45, prevents the clamping rins 32, 32' from being rotated when the adjusting rings 38, 38' which cooperate with said clamping rings are rotated.

Further, the adjusting rings 38, 38' of the two clamping device 30 and 31 each comprise two annular recesses 49, 50, 49', 50' in the form of slots which are coaxial with the shaft 22, which are pairwise in register viewed in the axial direction of the shaft 22. Each of thses two bounding walls of the slots 49, 49' and 50, 50' which are remote from the shaft 22 and which are coaxial with the shaft is formed with a gear segment 51, 51' or 52, 52' which is coaxial with the shaft. As is shown in FIGS. 3 and 5, the slots 41, 49, 50, 41', 49', 50', the gear segment 42, 42' which serves for rotating an adjusting ring 38, 38', and the two further gear segments 51, 52, 51', 52' are axially symmetrical relative to the shaft 22, so that a minimal radial space is occupied. The further gear segments 51, 51', 52, 52' on the two adjusting rings 38, 38' have equal pitch radii and identical teeth and are pairwise in register in the axial direction of the shaft 22, the pitch radii and the teeth of the further gear segments corresponding to the pitch radii and the teeth of the gear segments 42, 42' for rotating the adjusting rings 38, 38'.

The further gear segments 51, 51', 52, 52' are pairwise coupled to each other through a gear bridge 53 and 54, respectively. Each gear bridge 53 and 54 comprises two coaxial gear wheels 55, 55', 56, 56' which mesh with one of the two further gear segments 51, 51', 52, 52' of the two adjusting rings 38, 38'. These gear wheels engage in the slots 49, 49', 50, 50' in the adjusting rings 38, 38' and are rigidly connected to each other through a cylindrical connecting portion 57, 58 so that their identical teeth are in register in the axial direction of the shaft. Each connecting portion 57, 58 extends through a cylindrical bore 59, 60 in the drum half 17 and is rotatably guided in the relevant bore. The diameter of the connecting portions 57, 58 of each gear bridge 53, 54 is slightly larger than the diameter of the outside circle of the two gear wheels 55, 55' or 56, 56' interconnected by it, i.e. larger than the diameter of the root circle of said gear wheels. In this way the connecting portions 57, 58 and hence the entire gear bridge 53, 54 is kept floating in the axial direction of the shaft 22 between the two adjusting rings 38, 38' by the two further coincident gear segments 51, 51' and 52, 52' on the two adjusting rings 38, 38'. Via the gear bridges 53, 54' which are in mesh with the coincident further gear segments 51, 51' and 52, 52', the two gear segments 42, 42' which serve for rotating the two adjusting rings 38, 38' are also kept in register in the axial direction, even if the pinion 44 for driving the gear segments 42, 42' is not in mesh with these gear segments, so that by moving the pinion 44 in the axial direction of the shaft said pinion can always be brought into mesh with the gear segments 42, 42' which are always in register.

For adjusting the clamping rings 32, 32' in the axial direction of the shaft 22 when the adjusting rings 38, 38' are rotated, there are provided, as stated in the foregoing, cam-and-follower means which are arranged axially symmetrically relative to the shaft and which have the advantage of a favourable force transmission. The axially symmetrical arrangement of the cam-and-follower means results in an axially symmetrical force transmission between the adjusting rings and clamping rings. In the present case there are provided three cam-and-follower means 61, 62, 63, 61', 62', 63' which are arranged axially symmetrically relative to the shaft 22, which each comprise a cam surface which is formed on one of the two rings 32, 38, 32', 38', which is upwardly inclined towards the other one of the two rings, and which extends tangentially of the shaft, and a cam follower which cooperates with the cam surface and which is arranged on the other one of the two rings. The cam surfaces of each cam-and-follower means 61, 62, 63, 61', 62', 63' is arranged on the adjusting ring 38, 38' and is simply constituted by an annular portion 64, 65, 66, 64', 65', 66' of the adjusting rings 38, 38', which portion tapers down towards the clamping ring 32, 32'. These portions are formed in a combined cutting and bending operation from the originally flat blanks for the adjusting rings before they are subjected to a hardening process. The cam follower of each cam-and-follower means 61, 62, 63, 61', 62', 63' is formed on the clamping ring 32, 32' and simply comprises an annular portion 67, 68, 69, 67', 68', 69' which projects circumferentially from the clamping ring and which at least partly extends over the portion 64, 65, 66, 64', 65', 66' of the adjusting ring 38, 38' constituting the cam surface.

In order to mount the clamping devices 30 and 31 on the portions 28 and 29 the adjusting rings 38, 38' are slid onto these portions until they abut with the steps 39 and 40 of the drum half 17, after which the clamping rings 32, 32' are placed onto the portions in such a way that the clamping projections 33, 34, 35, 33', 34', 35' abut with the steps 36, 37 of said portions and the cylindrical bores 48, 48' in the clamping rings 32, 32' and the cylindrical bore 43 in the drum half 17 are aligned in the axial direction of the shaft 22, so that the slots 41, 41' in the adjusting rings 38, 38', which are also in register in the axial direction of the shaft, coincide at their ends. The clamping rings together with their clamping projections then have a conical shape. It is then effective if the clamping projections act radially on the relevant cylindrical portion with a small force in order to prevent the clamping rings and the adjusting rings from becoming detached inadvertently and to preclude an inadvertent rotation of the clamping rings. After the clampung devices 30 and 31 have been mounted they are in their released positions. By means of the pin 45 the pinion 44 is made to cooperate with the released clamping devices on the cylindrical portions 28 and 29 by moving said pinion in the axial direction of the shaft 22, as indicated by the arrow 70. The pinion 44 then engages the cylindrical bore 48 in the clamping ring 32, passes through the slot 41 in the adjusting ring 38, through the cylindrical bore 43 in the drum half 17, through the slots 41' in the adjusting ring 38' and through the cylindrical bore 48' in the clamping ring 32, the teeth 42, 42' of the pinion 44 engaging with the bounding walls of the slots 41, 41', as can be seen in FIGS. 3 and 4.

In order to secure the drum half 17 to the shaft 22 the drum half 17 is held by hand or by means of a device and the pinion 44 is driven via its pin 45 by hand or by means of a motor drive in the direction indicated by the arrow 71 in FIG. 3. As a result of this, the gear segments 42, 42' on the adjusting rings 38, 38' are driven with a favourable force transmission in the direction indicated by the arrow 72 in FIG. 3, so that the two adjusting rings 38, 38' are rotated in the direction of the arrow 72, the pinion 44, which extends through the bores 48, 48' in the clamping rings 32, 32', preventing said ring from being rotated. As a result of the rotation of the adjusting rings 38, 38' the portions 64, 65, 66, 64', 65', 66' of the adjusting rings 38, 38' which act as cam surfaces are moved relative to the portions 67, 68, 69, 67', 68', 69' of the clamping rings 32, 32' which act as cam followers. These cam-and-follower means also provide a satisfactory force transmission. As a result of this, each clamping ring 32, 32' is moved in an axial direction away from the relevant adjusting ring 38, 38', so that the adjusting rings adopt the flat shape instead of the conical shape, which again provides an effective force transmission. As the adjusting rings 38, 38' are rotated, the gear bridges 53 and 54 are driven via the gear segments 51, 51', 52, 52', the cylindrical connecting portions 57 and 58 of the gear bridges rotating in the cylindrical bores 59, 60 in the drum half 17 without subjecting the drum half to any undesired forces. As soon as the bounding walls at the ends 47, 47' of the slots 41, 41' abut with the pinion 44, as is shown in FIG. 5, the gear segments 42, 42', which are in mesh with the pinion 44, cannot be driven any further so that a further rotation of the pinion 44 is not possible. The portions 64, 65, 66, 64', 65', 66' of the adjusting rings which act as cam surfaces are then situated almost wholly behind the portions 47, 68, 69, 67, 68', 69' of the clamping rings 32, 32' which act as cam followers, so that the clamping rings retain their expanded flat shapes via the cam-and-follower means 61, 62, 63, 61', 62', 63' and the clamping projections 33, 34, 35, 33', 34', 35' of the clamping rings clamp the cylindrical portions 28, 29 onto the shaft 22. The clamping devices 30 and 31 are then in their tightened positions, after which the pinion 44 is disengaged from the two gear segments 42, 42' and is removed from the two clamping devices 30, 31, as can be seen in FIG. 6. The clamping devices 30 and 31 are released in a reverse sequence of operations, the pinion 44, which is in mesh with the gear segments 42, 42', being driven in the direction indicated by the arrow 71 until the bounding walls at the ends 46, 46' of the slots 41, 41' abut with the pinion 44, as shown in FIG. 3.

Clamping by means of clamping devices described above has the advantage that in total three favorable force transmissions are obtained, namely by means of the gear drive for the adjusting rings, the actuation of the clamping rings via cam-and-follower means, and the transition of the clamping rings from the conical to the flat shape. In this way such a high force transmission is achieved in that by means of very small actuating or driving forces for the pinion very high clamping forces are obtained which ensure that the clamping projections firmly secure the cylindrical portions to the shaft. Owing to the small actuating forces for the pinion only very small retaining forces are required for holding the drum half when it is secured, so that no internal stresses in and deformations of the drum half occur, thereby guaranteeing a uniform and non-eccentric rotation of the drum half and hence a correct operation of the apparatus.

It is obvious that the gear segments on the adjusting rings may also be arranged on the bounding walls of the slots which are situated closer to the shaft and which are coaxial with the shaft. The two adjusting rings may alternatively be coupled by means of a single gear bridge, in which case each adjusting ring comprises only one further gear segment. The bores in the clamping rings through which the pinion extends when the gear segments are driven in order to rotate the adjusting rings, may also be formed as U-shaped slots which extend up to the outer circumference of the clamping rings.

Figure 7:
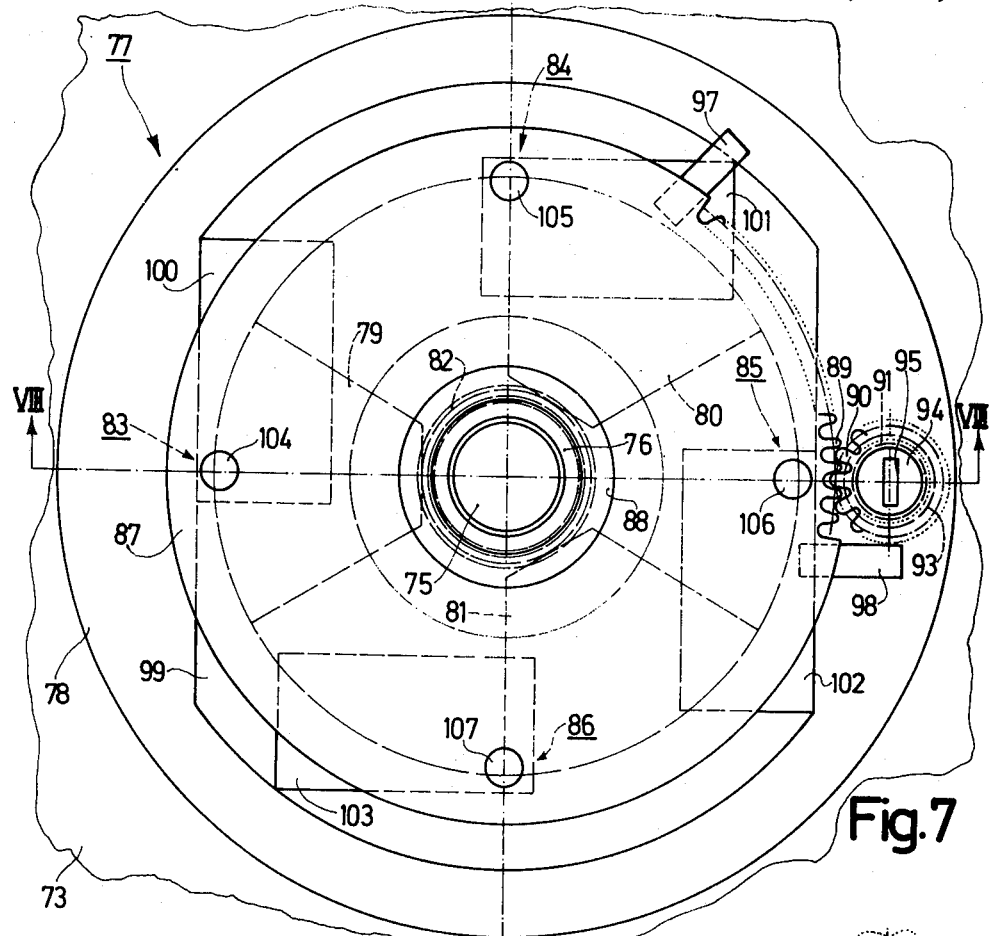
FIG. 7, in the same way as FIG. 3, is a plan view of the part of a drum half with a tightened clamping device in a second embodiment of the invention.
Figure 8:
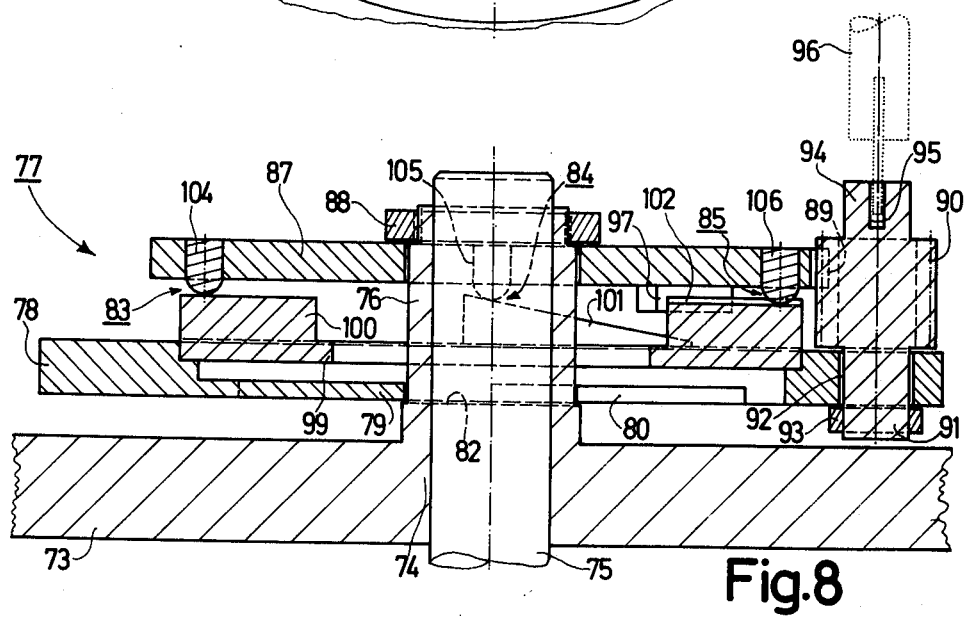
FIG. 8 is a sectional view, taken on the line IV—IV in FIG. 7, of the part of the drum half with the tightened clamping device.

In the embodiment shown in FIGS. 7 and 8 a rotatable drum half 73 comprises a single hollow cylindrical portion which projects from the hub 74, which is coaxial with the shaft 75, and which cooperates with a releasable clamping device 77 by means of which the drum half can be clamped onto the shaft.

The clamping device 77 comprises a clamping ring 78 which is coaxial with the shaft and which is adjustable in the axial direction, which clamping ring comprises three clamping projections 79, 80, 81 which extend radially relative to the shaft, which are inclined equally towards said shaft, and which are arranged axially symmetrically relative to the shaft 75. The clamping ring 78 has a flat shape both when it is released and when the clamping device has been tightened, the plane of the ring always extending perpendicularly to the shaft. The clamping projections are inclined relative to the plane of the clamping ring 78 when the clamping device is released, namely from the clamping ring 78 towards the drum half 73, which for the sake of simplicity is not shown. When the clamping device has been tightened the clamping projections extend parallel to the plane of the clamping ring, as will be apparent from FIG. 8. The free ends of the clamping projections 79, 80, 81 bear on a step 82 of the cylindrical portion 76, so that clamping projections are maintained at exactly the same level relative to the member 76 and the shaft 75.

For adjusting the clamping ring 78 in the axial direction of the shaft 75 the clamping device 77 comprises a rotatable adjusting ring 87 which is coaxial with the shaft and which cooperates with the clamping ring via four cam-and-follower means 83, 84, 85, 86 which are arranged axially symmetrically relative to the shaft 75, which adjusting ring on its side which is remote from the clamping ring 78 is supported axially symmetrically relative to the shaft 75 by the drum half 73 via a threaded ring 88 which is mounted on the cylindrical portion 76. On its circumference the adjusting ring 87 is formed with a gear segment 89, which can be driven by a rotatable pinion 90 which is constantly in mesh with the gear segment 89 in order to rotate the adjusting ring 87.

On the end which faces the drum half 73 the pinion 90 comprises a first cylindrical coaxial journal 91 with which the pinion 90 extends through a cylindrical bore 92 in the clamping ring 78, which bore is situated obliquely opposite the gear segment 89 of the adjusting ring 87, the bore wall of the bore 92 being in contact with the journal 91 of the pinion 90 for rotatably journalling the pinion 90. On the free end of the journal 91 a retaining ring 93 is mounted which prevents the pinion 90 from becoming disengaged from the clamping ring 78. On its end which is remote from the drum half 73 the pinion 90 comprises a second cylindrical coaxial journal 94 in which a slot 95 is formed. A drive member 96 for rotating the pinion 90 is represented schematically by the dotted lines in FIG. 8 and can engage the slot 95. The drive member is inserted so far into the slot 95 that rotation can be imparted to the pinion 90, but in such a way that no axial forces are exerted on the pinion 90, because such forces would be transmitted to the clamping ring and thereby load said ring asymmetrically, which would adversely affect a correct clamping.

In order to limit the range of rotation of the adjusting ring 87, which in the present example is approximately 45 degrees, two stops 97 and 98 project from the circumference of said ring, the stop abutting with the pinion 90 when the clamping device 77 is released and the stop 98 abutting with the pinion 90 when the clamping device has been tightened; the last-mentioned situation being shown in FIG. 7.

As already stated, four cam-and-follower means 83, 84, 85, 86 are arranged between the clamping ring 78 and the adjusting ring 87. A cam-surface support 99 is locked against rotation in a recess of the clamping ring 78 and is made of, for example, a low-friction nonabrading plastics material, four wedge-shaped projections 100, 101, 102, 103 which function as cam-surfaces extend upwardly from said support towards the adjusting ring 87. Each of these projections cooperates with a cam follower in the form of a pin 104, 105, 106, 107 which is mounted in the adjusting ring 87, which has a rounded free end and which slides over the cam surfaces of the projections 100, 101, 102, 103 when the adjucting ring 87 is rotated.

Clamping or releasing the clamping device shown in FIGS. 7 and 8 is effected in substantially the same way as in the case of the embodiment desribed with reference to FIGS. 3 to 6, so that this will not be described again. The embodiment shown in FIGS. 7 and 8 also provides a very effective force transmission owing to the gear drive for the adjusting ring, the adjustment of the clamping ring via the cam-and-follower means, and the change of the clamping projections from an inclined position relative to the clamping ring in the released condition to a position in which it is perpendicular to the shaft, rotation of the clamping ring when the adjusting ring is driven is precluded because of the cooperation with the pinion which is retained during driving of the driving tool via its journal which engages the bore in the clamping ring. Thus, the second embodiment has the same advantages as the first embodiment of the present invention. It is to be noted that by dispensing with the retaining ring which prevents the pinion from becoming detached from the clamping ring, this pinion can also be removed from the clamping device, in which case the tool for rotating the pinion may be connected to said pinion to form a simple and easy-to-handle unit.

What is claimed is:

1. A rotary scanning magnetic tape recorder, comprising
   at least one rotatable magnetic head which scans a magnetic tape along information tracks,
   a rotatable shaft,
   a support on which the head is mounted, said support comprising a hub by which the support is mounted on said shaft, and at least one hollow cylindrical portion which is coaxial with the shaft and which projects axially from the hub, and
   a releasable clamping device for clamping said portion onto said shaft, said device comprising
      an axially adjustable clamping ring disposed coaxially with the shaft, said ring comprising at least three clamping projections inclined equally and arranged axially symmetrically relative to the shaft, which projections project radially towards the shaft and act on said cylindrical portion, and
      a rotatable adjusting ring for adjusting the clamping ring, said adjusting ring cooperating with said clamping projections to clamp the cylindrical portion onto the shaft upon rotation of the adjusting ring with respect to the support,
   characterized in that, on a side remote from the clamping ring, the adjusting ring bears on the support axially symmetrically relative to the shaft,
   the clamping device includes means for rotating the adjusting ring with respect to the support, said means including an axially symmetrical arrangement of gear segments and bores, said gear segments being coaxial with said shaft, said gear segments and bores being arranged to be engageable by a rotatable pinion inserted through one of said bores and meshing with one of said gear segments to rotate the gear segment in response to rotation of the pinion,
   the device further includes at least three cam-and-follower arrangements for adjusting the clamping ring at locations respectively related to said clamping ring projections as a result of rotation of the adjusting ring, said arrangements being arranged axially symmetrically relative to the shaft, and
   each of said arrangements comprises a cam surface on one of said rings, and a cam follower arranged on the other of said rings for cooperation with said cam surface.

2. A recorder as claimed in claim 1, characterized in that each of said gear segments is an annular gear segment formed in said adjusting ring, and each of said bores extends in a direction parallel to said shaft through the clamping ring adjacent the respective gear segment.

3. A recorder as claimed in claim 2, characterized in that each of said bores is cylindrical, arranged such that the entire bore wall is positioned against the pinion.

4. A recorder as claimed in claim 2, characterized in that the adjusting ring has a plurality of annular slots arranged coaxially with the shaft, each of said gear segments being disposed on one of the bounding walls of the slot which are coaxial with the shaft.

5. A recorder as claimed in claim 4, characterized in that the one end of the slot abuts the pinion in mesh with the gear segment when the clamping device is fully released, and the other end of the slot abuts the pinion when the clampiing device has been fully tightened.

6. A recorder as claimed in claim 5, characterized in that each of said cam-and-follower arrangements includes a cam surface formed on an annular portion of the adjusting ring inclined toward the clamping ring, and
   each cam follower comprises an annular portion of the clamping ring projecting from the circumference of the clamping ring and aligned at least partly over the respective cam surface of the adjusting ring.

7. A recorder as claimed in claim 4, characterized in that each of said cam-and-follower arrangements includes a cam surface formed on an annular portion of the adjusting ring inclined toward the clamping ring, and
   each cam follower comprises an annular portion of the clamping ring projecting from the circumference of the clamping ring and aligned at least partly over the respective cam surface of the adjusting ring.

8. A recorder as claimed in claim 2, characterized in that each of said cam-and-follower arrangements includes a cam surface formed on an annular portion of the adjusting ring inclined toward the clamping ring, and
   each cam follower comprises an annular portion of the clamping ring projecting from the circumference of the clamping ring and aligned at least partly over the respective cam surface of the adjusting ring.

9. A recorder as claimed in claim 8, characterized in that said gear segments and bores are arranged to be engageable by a removable pinion, which pinion is inserted to perform adjustment.

10. A recorder as claimed in claim 5, characterized in that said gear segments and bores are arranged to be engageable by a removable pinion, which pinion is inserted to perform adjustment.

11. A recorder as claimed in claim 3, characterized in that said gear segments and bores are arranged to be engageable by a removable pinion, which pinion is inserted to perform adjustment.

12. A recorder as claimed in claim 2, characterized in that said gear segments and bores are arranged to be engageable by a removable pinion, which pinion is inserted to perform adjustment.

13. A recorder as claimed in claim 12, characterized in that said removable pinion includes an actuating member for rotary drive of said pinion.

14. A recorder as claimed in claim 12, in which said support comprises two said hollow cylindrical portions projecting from the hub in opposite axial directions, and a respective clamping device for each hollow portion, characterized in that each of said clamping devices comprises respective said gear segments and bores, each of said gear segments having equal pitch radii and identical teeth, and respective said bores being aligned axially, for simultaneous rotation of said two adjusting rings by a pinion which extends through two respective bores for engagement with a respective gear segment on each of said adjusting rings.

15. A recorder as claimed in claim 7, in which said support comprises two said hollow cylindrical portions projecting from the hub in opposite axial directions, and a respective clamping device for each hollow portion, characterized in that each of said clamping devices comprises respective said gear segments and bores, each of said gear segments having equal pitch radii and identical teeth, and respective said bores being aligned axially, for simultaneous rotation of said two adjusting rings by a pinion which extends through two respective bores for engagement with a respective gear segment on each of said adjusting rings.

16. A recorder as claimed in claim 5, in which said support comprises two said hollow cylindrical portions projecting from the hub in opposite axial directions, and a respective clamping device for each hollow portion, characterized in that each of said clamping devices comprises respective said gear segments and bores, each of said gear segments having equal pitch radii and identical teeth, and respective said bores being aligned axially, for simultaneous rotation of said two adjusting rings by a pinion which extends through two respective bores for engagement with a respective gear segment on each of said adjusting rings.

17. A recorder as claimed in claim 2, in which said support comprises two said hollow cylindrical portions projecting from the hub in opposite axial directions, and a respective clamping device for each hollow portion, characterized in that each of said clamping devices comprises respective said gear segments and bores, each of said gear segments having equal pitch radii and identical teeth, and respective said bores being aligned axially, for simultaneous rotation of said two adjusting rings by a pinion which extends through two respective bores for engagement with a respective gear segment on each of said adjusting rings.

18. A recorder as claimed in claim 17, characterized in that each of said adjusting rings of the two clamping devices comprises at least one further gear segment coaxial with the shaft, respective gear segments on the two rings having equal pitch radii and identical teeth, axially in register with and coupled to each other by a gear bridge, and in that the respective gear segments for rotating the two adjusting rings are also axially in register.

19. A recorder as claimed in claim 14, characterized in that each of said adjusting rings of the two clamping devices comprises at least one further gear segment coaxial with the shaft, respective gear segments on the two rings having equal pitch radii and identical teeth, axially in register with and coupled to each other by a gear bridge, and in that the respective gear segments for rotating the two adjusting rings are also axially in register.

20. A recorder as claimed in claim 19, characterized in that said gear bridge comprises two separate coaxial gear wheels each meshing with a respective one of the two further gear segments on the adjusting rings, a cylindrical connecting member connected to each of said separate coaxial gear wheels and having a diameter larger than the diameter of the root circle of the separate gear wheels, and being arranged to be retained by said two further gear segments on the two adjusting rings so as to float axially between the two adjusting rings.

21. A recorder as claimed in claim 18, characterized in that said gear bridge comprises two separate coaxial gear wheels each meshing with a respective one of the two further gear segments on the adjusting rings, a cylindrical connecting member connected to each of said separate coaxial gear wheels and having a diameter larger than the diameter of the root circle of the separate gear wheels, and being arranged to be retained by said two further gear segments on the two adjusting rings so as to float axially between the two adjusting rings.

22. An apparatus as claimed in claim 20, characterized in that each of said adjusting rings has at least one annular recess having two bounding walls coaxial with the shaft, one of the further gear segments being formed on one of the two bounding walls of each recess.

23. An apparatus as claimed in claim 18, characterized in that each of said adjusting rings has at least one annular recess having two bounding walls coaxial with the shaft, one of the further gear segments being formed on one of the two bounding walls of each recess.

24. A recorder as claimed in claim 22, characterized in that the gear segment actuable for rotating a given adjusting ring is disposed on said ring, and at least one further gear segment is disposed on said ring axially symmetrically relative to said shaft.

25. A recorder as claimed in claim 20, characterized in that the gear segment actuable for rotating a given adjusting ring is disposed on said ring, and at least one further gear segment is disposed on said ring axially symmetrically relative to said shaft.

26. A recorder as claimed in claim 18, characterized in that the gear segment actuable for rotating a given adjusting ring is disposed on said ring, and at least one further gear segment is disposed on said ring axially symmetrically relative to said shaft.

27. An apparatus including a removable support which is mounted on a rotatable shaft, comprising
a rotatable shaft,
a support comprising a hub by which the support is mounted on said shaft, and at least one hollow cylindrical portion which is coaxial with the shaft and which projects axially from the hub, and
a releasable clamping device for clamping said portion onto said shaft, said device comprising
an axially adjustable clamping ring disposed coaxially with the shaft, said ring comprising at least three clamping projections inclined equally and arranged axially symmetrically relative to the shaft, which projections project radially towards the shaft and act on said cylindrical portion, and
a rotatable adjusting ring for adjusting the clamping ring, said adjusting ring cooperating with said clamping projections to clamp the cylindrical portion onto the shaft upon rotation of the adjusting ring with respect to the support,
characterized in that, on a side remote from the clamping ring, the adjusting ring bears on the support axially symmetrically relative to the shaft,
the clamping device includes means for rotating the adjusting ring with respect to the support, said means including at least one surface disposed respectively on each of said rings, arranged to be engageable by a rotatable element such that, upon rotation of said element through a given angle about an axis spaced from said shaft, the element bears respectively against one of said surfaces on each ring and rotates the adjusting ring with respect to the clamping ring through an angle less than said given angle, the device further includes at least three cam-and-follower arrangements for adjusting the clamping ring at locations respectively related to said clamping ring projections as a result of rotation of the adjusting ring, said arrangements being arranged axially symmetrically relative to the shaft, and each of said arrangements comprises a cam surface on one of said rings, and a cam follower arranged on the other of said rings for cooperation with said cam surface.

28. An apparatus as claimed in claim 27, characterized in that one of said surfaces is a peripheral surface of a bore through said clamping ring, and said element is a removable tool which is inserted through said bore to engage the surface on the adjusting ring.

29. An apparatus as claimed in claim 27, characterized in that the number of equally-spaced cam-and-follower arrangements is greater than the number of clamping projections.

* * * * *